(12) United States Patent
Tanaka et al.

(10) Patent No.: US 7,721,624 B2
(45) Date of Patent: May 25, 2010

(54) AUTOMATIC TRANSMISSION AND RUNNING RANGE SWITCHING DEVICE

(75) Inventors: Michimasa Tanaka, Anjo (JP); Kazumichi Kayama, Anjo (JP); Takeo Arai, Anjo (JP); Kazumasa Tsukamoto, Anjo (JP); Kazuhisa Ozaki, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 663 days.

(21) Appl. No.: 11/527,701

(22) Filed: Sep. 27, 2006

(65) Prior Publication Data

US 2007/0129199 A1 Jun. 7, 2007

(30) Foreign Application Priority Data

Sep. 30, 2005 (JP) .............................. 2005-289434

(51) Int. Cl.
F16H 57/02 (2006.01)
F16H 57/04 (2006.01)
F16H 61/00 (2006.01)

(52) U.S. Cl. .................................................. 74/606 R
(58) Field of Classification Search ................ 74/606 R
See application file for complete search history.

(56) References Cited

U.S. PATENT DOCUMENTS

| 4,817,471 | A | * | 4/1989 | Tury | 477/125 |
| 4,873,881 | A | * | 10/1989 | Edelen et al. | 74/336 R |
| 6,315,073 | B1 | | 11/2001 | Nonaka | |
| 6,327,927 | B1 | * | 12/2001 | Rogg et al. | 74/335 |
| 6,401,899 | B1 | * | 6/2002 | Kanehisa et al. | 192/219.5 |
| 6,499,371 | B2 | * | 12/2002 | Tsuzuki et al. | 74/335 |
| 7,146,871 | B2 | * | 12/2006 | Ozaki et al. | 74/335 |
| 2004/0261559 | A1 | | 12/2004 | Ozaki et al. | |

FOREIGN PATENT DOCUMENTS

| EP | 1 469 236 A2 | 10/2004 |
| JP | A-2000-71806 | 3/2000 |
| JP | A-2005-3090 | 1/2005 |
| JP | 2005-207570 | 8/2005 |
| JP | A-2005-207570 | 8/2005 |

* cited by examiner

*Primary Examiner*—Tisha D Lewis
(74) *Attorney, Agent, or Firm*—Oliff & Berridge, PLC

(57) ABSTRACT

An automatic transmission that includes a case; and a range shift device that includes: a housing with an opening portion on one side, a motor that produces a driving force based on a signal from a manually operated shift operating device, and a mechanical transmission that transmits the driving force of the motor to a manual valve, wherein the range shift device shifts a running range in accordance with a shift position of the manual valve, and the case has a joining portion that closes the opening portion of the housing.

11 Claims, 10 Drawing Sheets

AUTOMATIC TRANSMISSION AND RUNNING RANGE SWITCHING DEVICE

INCORPORATION BY REFERENCE

The disclosure of Japanese Patent Application No. 2005-289434 filed on Sep. 30, 2005 including the specification, drawings and abstract is incorporated herein by reference in its entirety.

BACKGROUND

The present invention relates to an automatic transmission and a range shift device.

In general, a running range of a vehicle provided with an automatic transmission is set by a driver operating a shift lever that moves a manual valve and thus changes oil passage. A system known as a shift-by-wire system can be used for setting the running range selected by the driver through an electric signal, without relying on a mechanical wire or rod (see Japanese Patent Application Publication No. JP-A-2005-207570 for an example).

Furthermore, a range shift device for shifting the running range can also be used as described in Japanese Patent Application Publication No. JP-A-2005-207570, for example. FIGS. 10A-10C show such a range shift device 201. The vehicular range shift device 201 includes a motor 204 for rotational driving based on an electric signal from a shift lever (not shown), which acts as manually operated shift operating driver; a mechanical transmission mechanism 260 for transmitting the rotation of the motor 204 to a manual valve (not shown); and a detent member (not shown). The mechanical transmission mechanism 260 includes a ball screw shaft 221, a ball nut 222, and an arm member 206. The rotational motion that has been output from the motor 204 is designed to convert back to a rotational motion following a conversion from rotational motion to linear motion. Also, the motor 204 is provided on an outer side of a housing 210 of the range shift device 201, and the mechanical transmission mechanism 260 is accommodated in the housing 210.

In addition, the range shift device 201 is provided in a case 262 of an automatic transmission. Inside the case 262, a speed change mechanism is provided for changing a speed of an engine, and a lubricant (i.e., oil) circulates.

Based on the electric signal generated by a manual operation of the shift lever, the range shift device 201 operates the manual valve (not shown), via the mechanical transmission mechanism 260 and the detent member, so as to shift the engine speed range in the automatic transmission.

SUMMARY

However, for the vehicular range shift device 201 in current use, the entire housing 210 is attached to the case 262 of the automatic transmission. Accordingly, if the range shift device 201 is disposed in the case 262 of the automatic transmission, then a wall of the housing 210 of the range shift device 201 and a wall of the case 262 of the automatic transmission are placed next to each other. The automatic transmission thus becomes larger because of the two adjacent walls, resulting in decreased mountability in the vehicle.

Furthermore, grease is applied to the mechanical transmission mechanism 260 in order to maintain the smooth operation of the mechanical transmission mechanism 260 inside the range shift device 201. However, the grease may deteriorate due to long-term use and affect the smoothness of the operation of the mechanical transmission mechanism 260.

The present invention thus provides, among other things, an automatic transmission that achieves improved mountability of a range shift device in a vehicle without enlarging a case of the automatic transmission, and further provides an automatic transmission in which a long-term smooth operation of the range shift device is maintained.

The present invention also provides an automatic transmission that achieves improved mountability of a range shift device in a vehicle without enlarging a case of the automatic transmission, and further provides a range shift device that uses oil in the automatic transmission to maintain a long-term smooth operation.

The present invention, according to an exemplary aspect includes an automatic transmission with a case; and a range shift device that includes: a housing with an opening portion on one side, a motor that produces a driving force based on a signal from a manually operated shift operating device, and a mechanical transmission that transmits the driving force of the motor to a manual valve, wherein the range shift device shifts a running range in accordance with a shift position of the manual valve, and the case has a joining portion that closes the opening portion of the housing.

The present invention, according to another exemplary aspect, includes an automatic transmission with a range shift device that includes a motor that produces a driving force based on a signal from a manually operated shift operating device, and a mechanical transmission that transmits the driving force of the motor to a manual valve; and a case that is formed with a communication hole that circulates and guides oil to the mechanical transmission of the range shift device.

The present invention, according to another exemplary aspect, includes a range shift device with a shift lever by which a driver selects a running range; a motor that is controlled based on a signal from the shift lever; a conversion mechanism that converts a rotational motion of the motor into a linear motion; an intermediate member that converts the linear motion converted by the conversion mechanism into a swinging motion; and an interlocking mechanism that is operatively associated with a manual valve via a shaft of the intermediate member, wherein oil from an automatic transmission is circulated in a space where the conversion mechanism and the intermediate member are accommodated.

BRIEF DESCRIPTION OF THE DRAWINGS

Various exemplary aspects will be described with reference to the drawings, wherein:

FIG. 10A is a drawing showing an internal structure, FIG. 10B is a cross-sectional view taken along arrows E-E in FIG. 10A, and FIG. 10C is a cross-sectional view taken along arrows F-F in FIG. 10A.

DETAILED DESCRIPTION OF EMBODIMENTS

Figure 1:
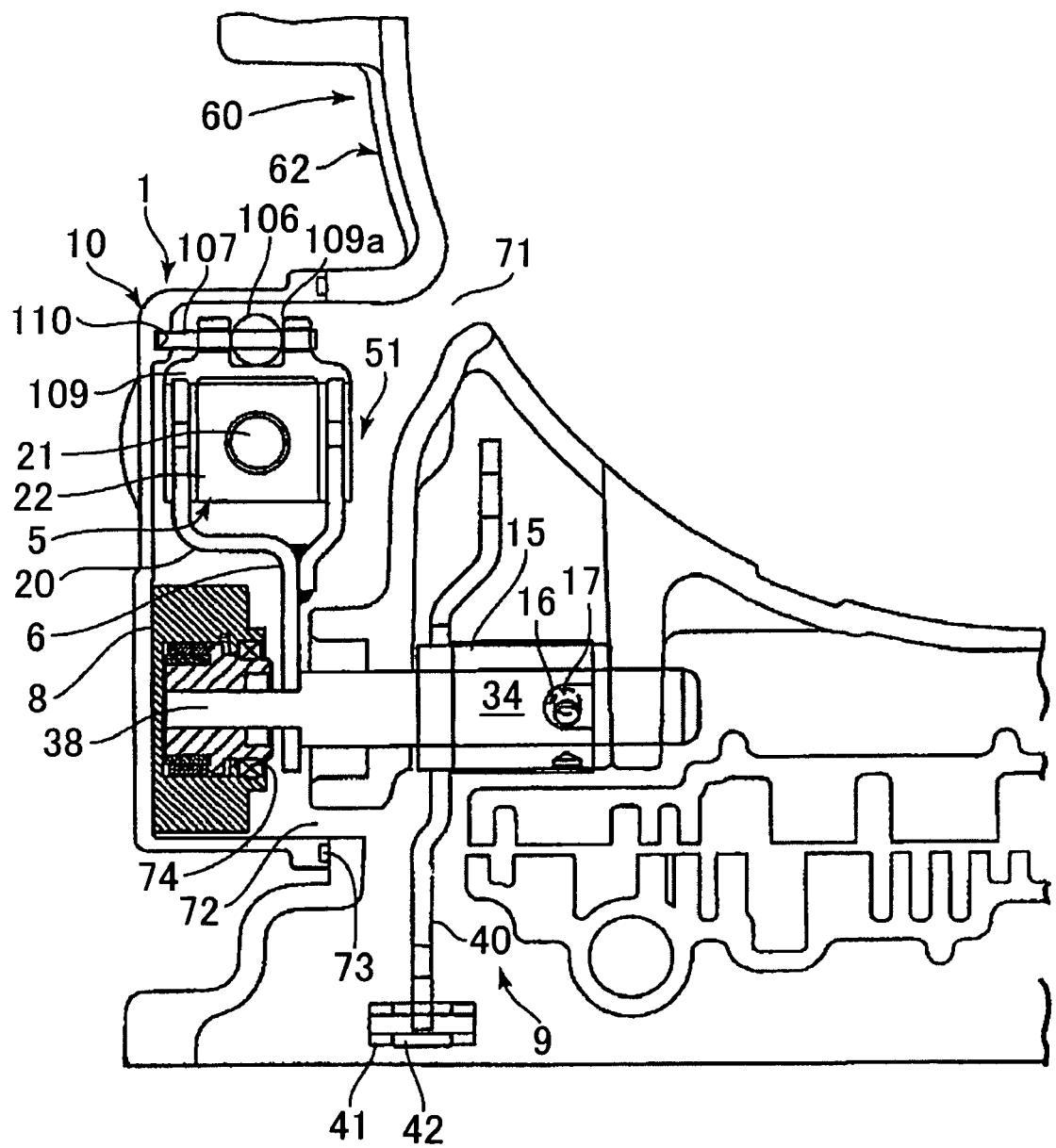
FIG. 1 is a front cross-sectional view of a portion of an automatic transmission in which a range shift device is incorporated according to a first embodiment of the present invention.

Hereinafter, an automatic transmission and a range shift device according to a first embodiment of the present invention will be described with reference to FIGS. 1 to 5, and the automatic transmission and the range shift device according to a second embodiment of the present invention will be described with reference to FIGS. 6 to 9. Note that like reference numerals used in the drawings for the first embodiment and the drawings for the second embodiment denote portions with like functions and effects, regardless of differences in shape or position of installation. Overlapping descriptions of such portions shall thus be omitted as appropriate.

First Embodiment

Figure 5:
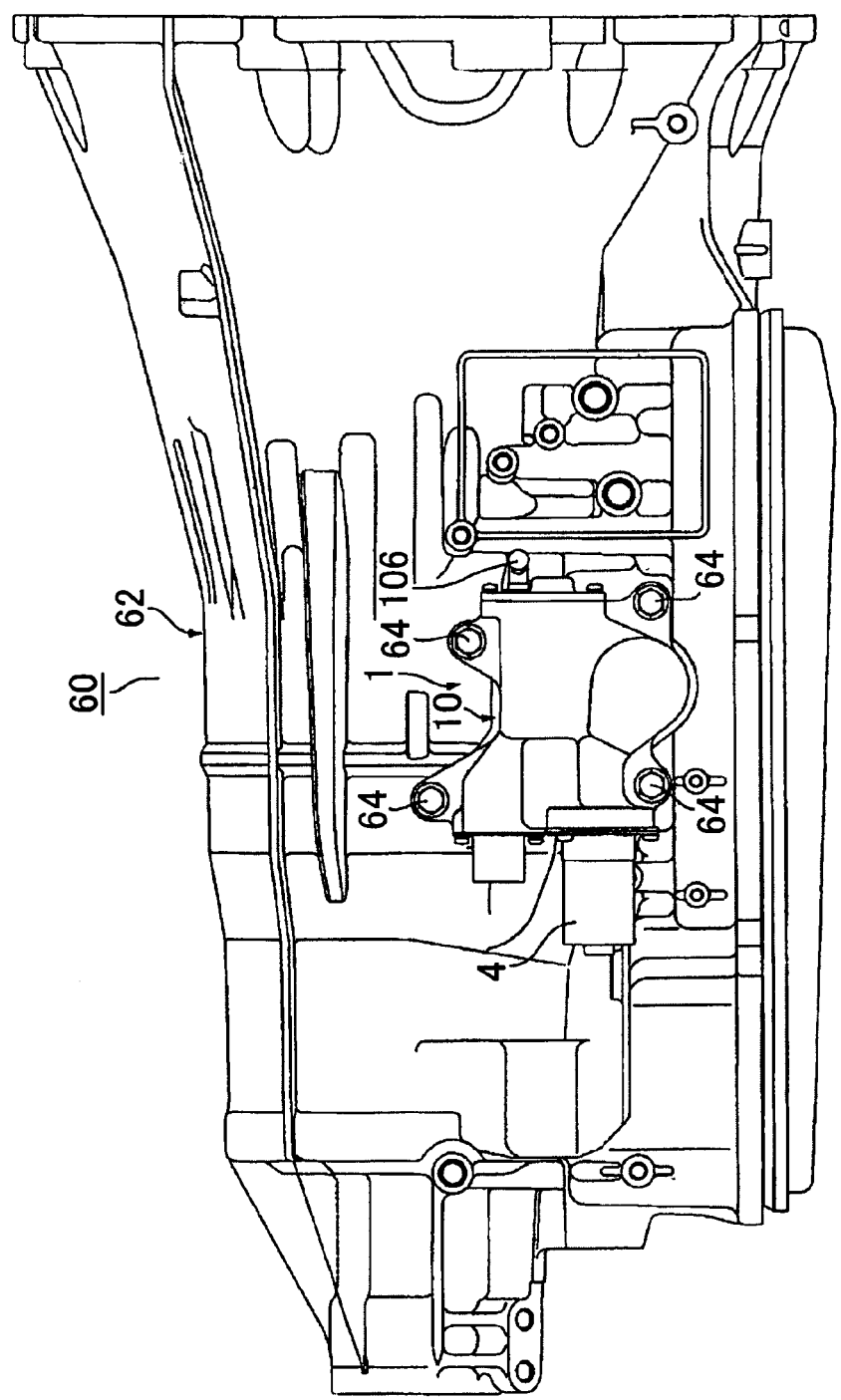
FIG. 5 is an external view of a portion of the automatic transmission in FIG. 1 where the range shift device is provided.
Figure 6:
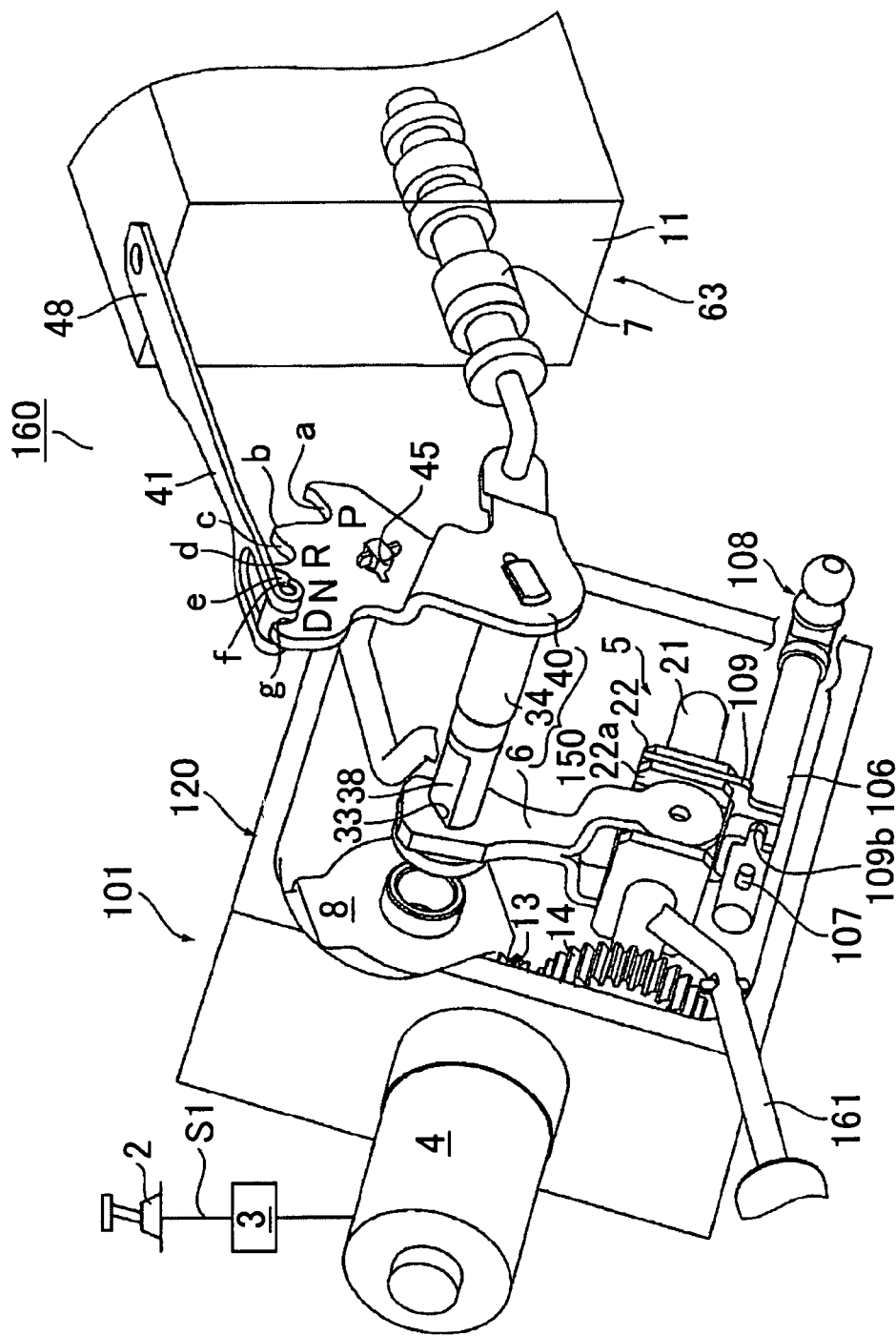
FIG. 6 is an external schematic view of the range shift device in the automatic transmission according to a second embodiment of the present invention.
Figure 7:
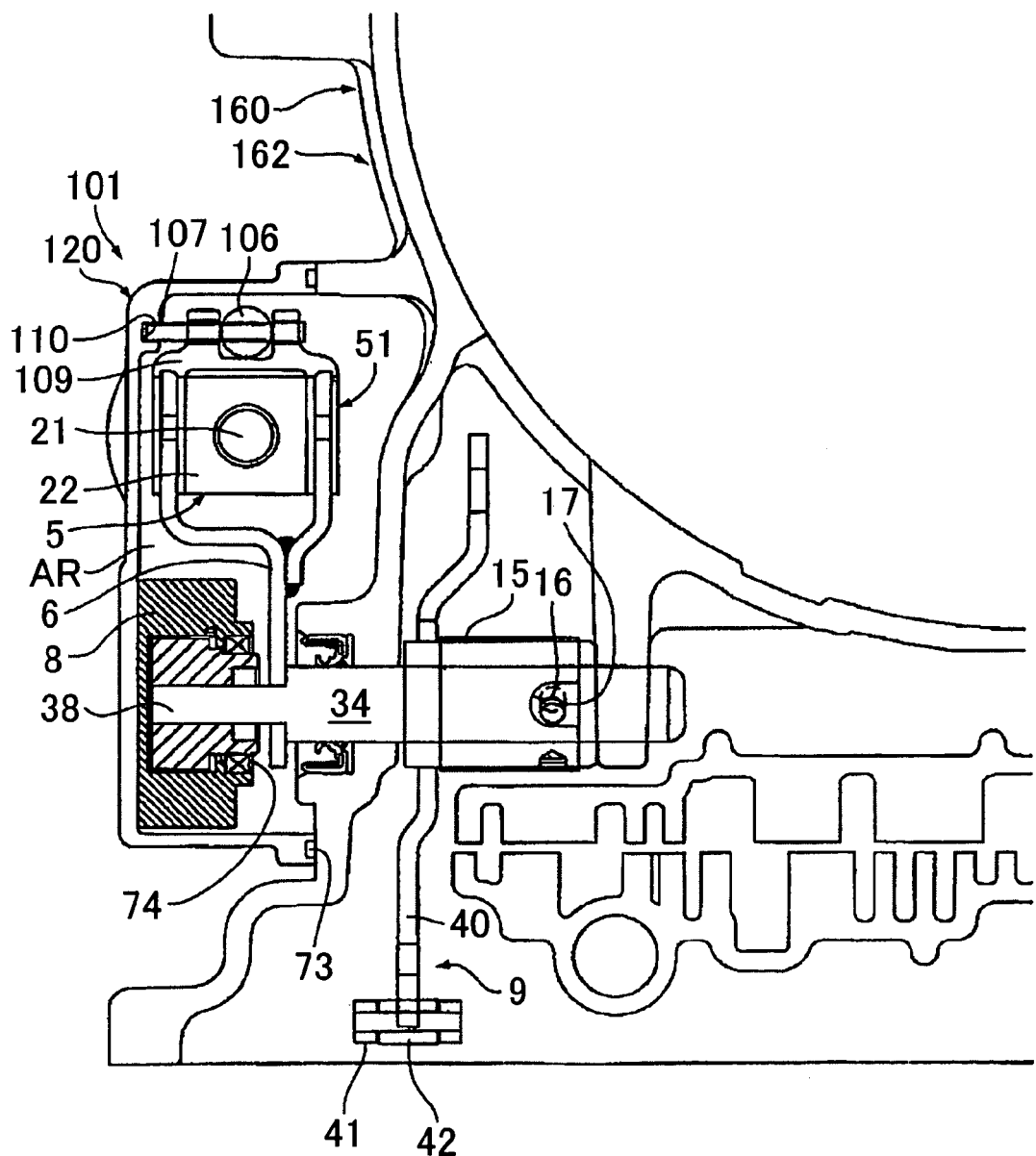
FIG. 7 is a front cross-sectional view of a portion of the automatic transmission in which the range shift device is incorporated according to the second embodiment of the present invention.
Figure 8:
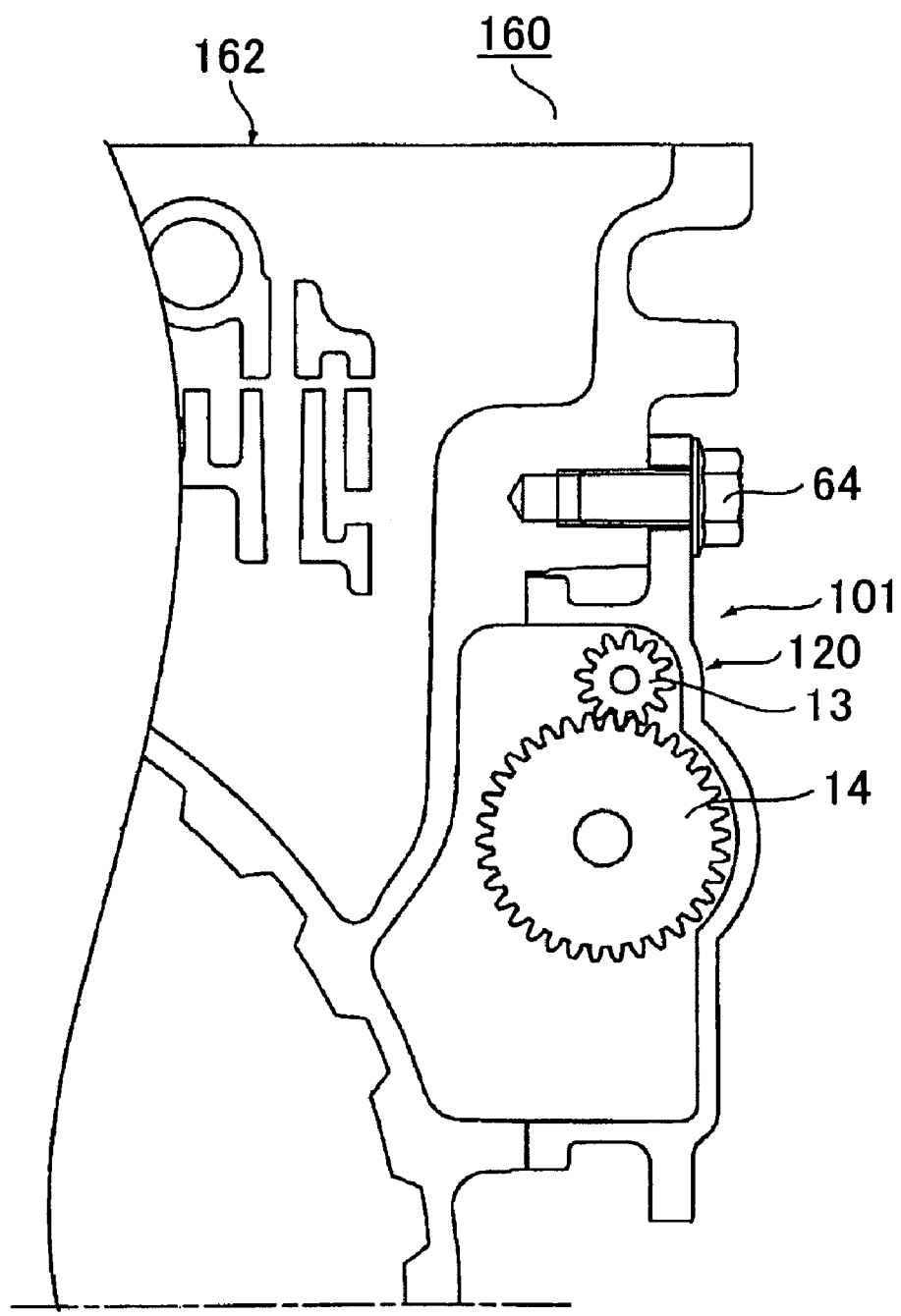
FIG. 8 is a left side cross-sectional view of FIG. 7.
Figure 9:
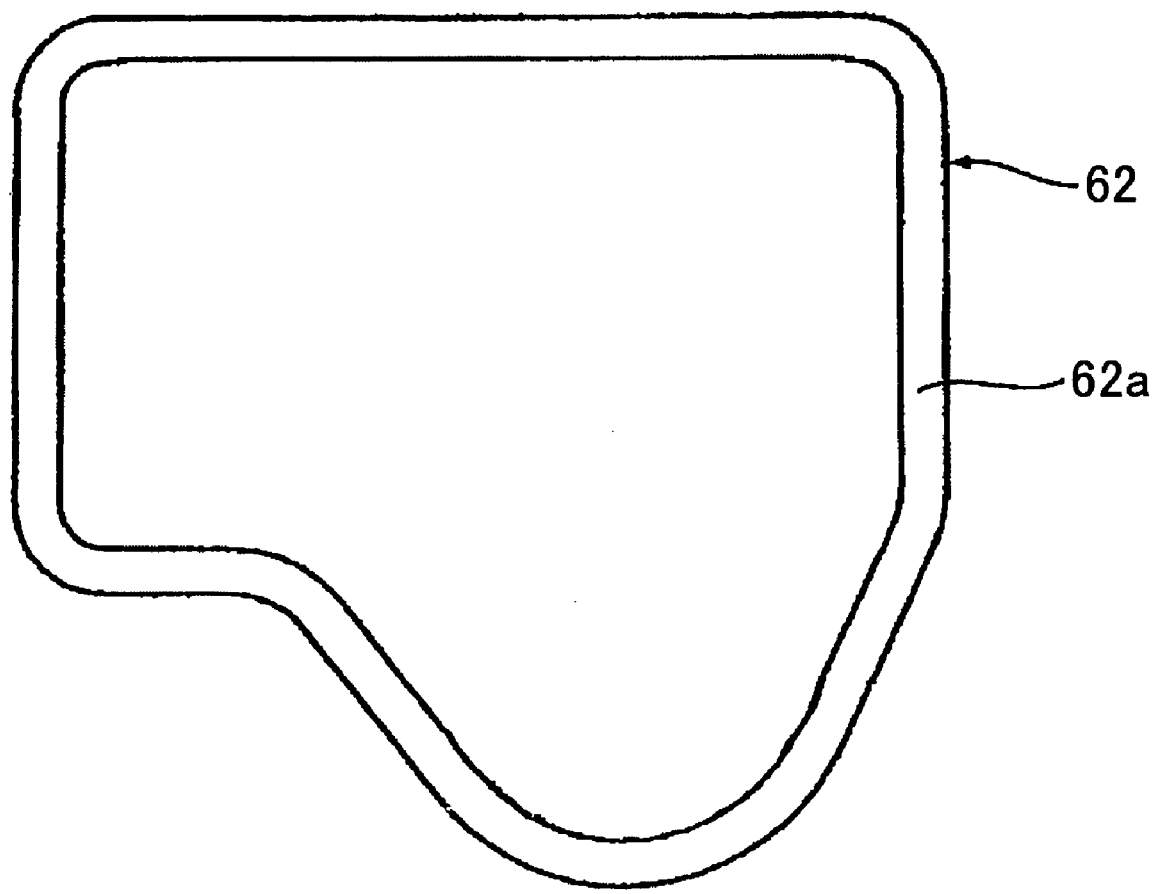
FIG. 9 is a view similar to FIG. 4.
Figure 10A:
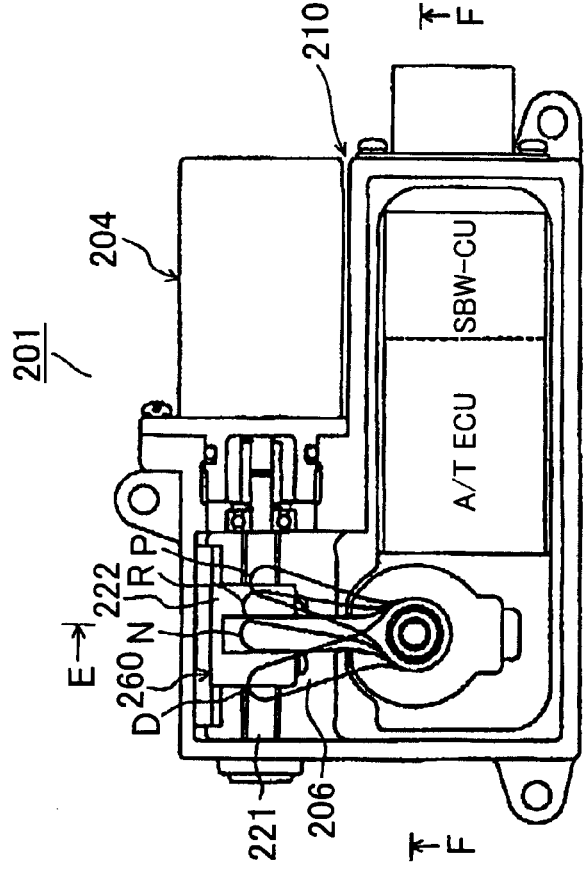
FIGS. 10A-10C are drawings of a conventional range shift device, where
Figure 10B:
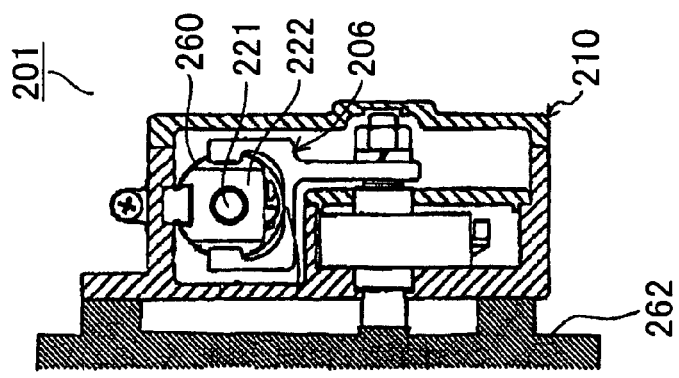
Figure 10C:
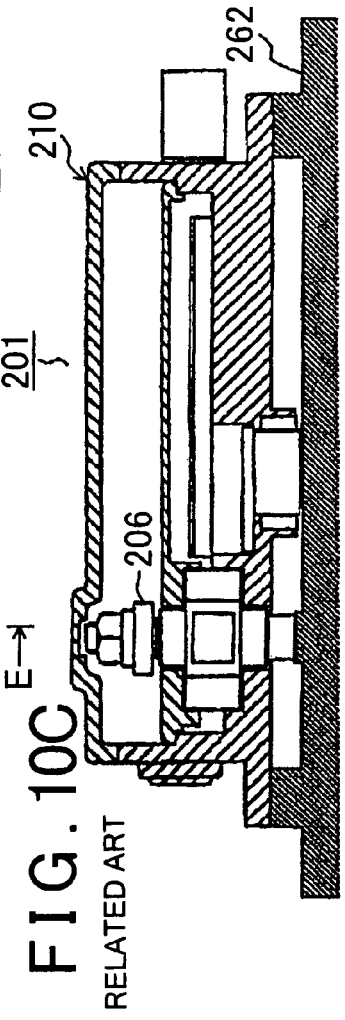

Referring to FIG. 5, a range shift device 1 is attached by a bolt 64 to an automatic transmission (such as a multi-stage automatic transmission or a continuously variable transmission (CVT)) 60 mounted in a vehicle.

Figure 2A:
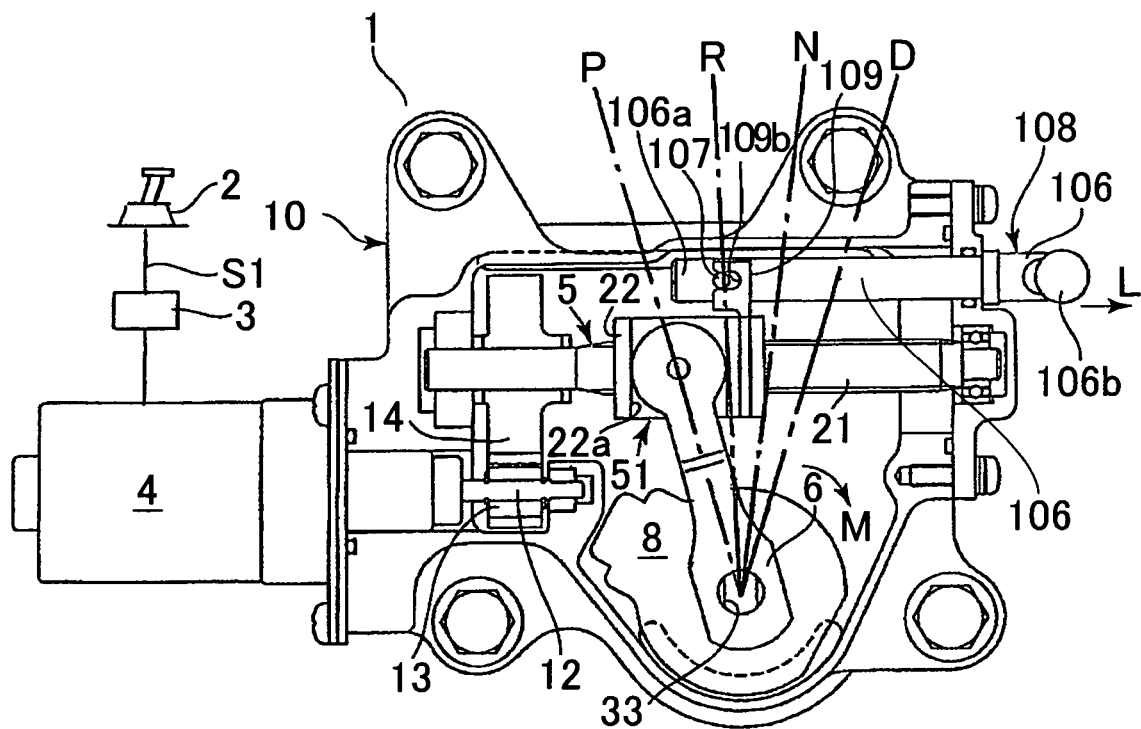
FIG. 2A is a right side view of the range shift device in FIG. 1.
Figure 2B:
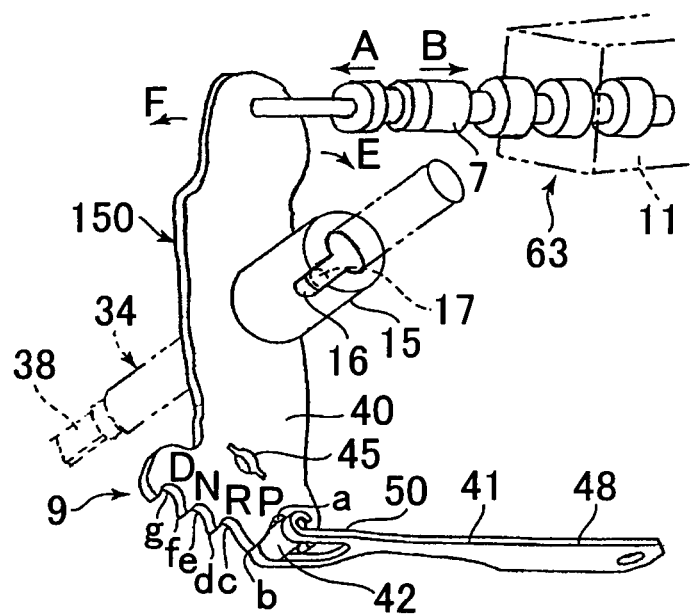
FIG. 2B is a perspective view of a range control shaft and a detent mechanism.

Referring to FIGS. 2A and 2B, the range shift device 1 includes the following: a shift lever 2 (which is an example of a manually operated shift operating device) by which a driver selects a running range; a control unit 3 that generates an electric signal (a control signal) based on an electric signal (a shift signal) S1 from the shift lever 2; a motor 4 that is a drive source and is controlled based on the control signal from the control unit 3; a conversion mechanism 5 that converts the rotational motion of the motor 4 into a linear motion; an arm member 6 (which is an example of an intermediate member) that converts the linear motion converted by the conversion mechanism 5 into a swinging motion; a spool 7 that acts as a range shift member and is moved by the arm member 6; a position sensor 8 that is an electronic part and detects a position of the spool 7 via the arm member 6; a detent mechanism 9 that positions and holds the spool 7; and a manual release mechanism 108 that is separate from the motor 4 and shifts the spool 7 by manual operation.

Among the above structural elements, the control unit 3, the conversion mechanism 5, the arm member 6, the position sensor 8, the manual release mechanism 108, and the like are accommodated inside a housing 10. The motor 4 is attached to an outer side of the housing 10. The spool 7 is disposed inside a valve body 11 of the automatic transmission 60. In addition, disposed between the conversion mechanism 5 and the spool 7 is an intermediate member 150 that acts as a power transmission member. The intermediate member 150 includes the arm member 6, a range control shaft 34 (described later), and a detent lever 40 (described later).

The shift lever 2 shown in FIG. 2A will now be explained. Running ranges (not shown) of the automatic transmission are indicated: P (parking) range, R (reverse) range, N (neutral) range, and D (drive) range. The shift lever 2 is a lever that is directly operated by the driver so as to select one running range from among the above running ranges. The shift signal S1 corresponding to the selected running range is then generated. Note that the shift lever 2 is capable of reflecting the driver's intent, i.e., is capable of generating the shift signal S1 corresponding to the running range selected by the driver. However, a shift button, a shift switch, a voice input system, or the like may also be used instead of the shift lever 2, for example.

The control unit 3 shown in FIGS. 2A and 2B generates the control signal based on the shift signal S1 generated by the above shift lever 2, and includes a function to control the rotation of the motor 4. When a detection signal is input from the position sensor 8, which detects the position of the spool 7, the control unit 3 is designed to control the rotation direction, and the rotation start/stop timing of the motor 4. Such a control unit 3 is a control unit (SBW-CU) for controlling a so-called shift-by-wire system (SBW). The shift-by-wire system is a control mechanism that, in order to shift the running range, controls the motion of the spool 7 through the motor 4 based on the shift signal S1 from the shift lever 2. The control unit 3 is disposed in an internal portion of the housing 10.

The housing 10 shown in FIG. 2A will now be explained. The housing 10 is fixed to a case 62 of the automatic transmission. The motor 4 is attached to the outer side of the housing 10 such that an output shaft 12 is inserted into the housing 10. For the motor 4, a DC motor with a permanent magnet is used, and the rotation direction, rotation duration, and rotation timing are controlled by the control unit 3.

The conversion mechanism 5 shown in FIGS. 1 to 3 will now be explained. The conversion mechanism 5 employs a ball screw. The ball screw includes the following: a ball screw shaft 21 that is a screw member to which rotational force is transmitted from the motor 4 by gears 13 and 14 for rotating the ball screw shaft 21; a ball nut 22 that is a nut member that is engaged with the ball screw shaft 21 and movable in the axial direction; and a plurality of balls (not shown) that are interposed between the ball screw shaft 21 and the ball nut 22. The ball nut 22 is engaged so as to be movable in the axial direction and unrotatable with respect to the rotation of the ball screw shaft 21. The exterior of the ball nut 22 is formed in a generally angular shape, and both sides are formed with a concave portion 22a (see FIG. 2A).

The manual release mechanism 108 shown in FIGS. 1 to 3 will now be explained. The ball nut 22 is connected with the manual release mechanism 108. In the event of a breakdown (failure) such as a disconnection or short circuit in the motor 4, the range shift device 1 may not be able to rotate the ball screw shaft 21 to shift the running range. The manual release mechanism 108 is thus provided as a countermeasure for times when such problems occur.

The manual release mechanism 108 includes the following: a release rod 106 that is a pole-shaped portion disposed parallel to the ball screw shaft 21 and supported on the housing 10 movable in the axial direction; and a pin 107 that is provided running through an end portion 106a of the release rod 106. The pin 107 is provided facing orthogonal to the release rod 106. Connected to a base portion 106b of the release rod 106 is a wire (not shown) that is capable of pulling the release rod 106 in the direction of arrow L.

The housing 10 is formed with a concave groove 110 (see FIGS. 1 and 3) along the release rod 106. The concave groove 110 is engaged with an end of the pin 107. Accordingly, an intermediate portion of the release rod 106 is supported by the housing 10, and the end portion 106a is supported by the engagement of the pin 107 and the concave groove 110. Therefore, the release rod 106 is supported overall by the housing 10 with the use of a simple mechanism.

The ball nut 22 is provided with a connection member 109. The connection member 109 receives the release rod 106 and is formed with a U-shaped portion 109a, which is slidable with respect to the release rod 106. The U-shaped portion 109a is formed facing a direction opposite from the ball screw shaft 21. In addition, the U-shaped portion 109a is formed with a concave portion 109b (see FIG. 2A) that receives the pin 107. The concave portion 109b is formed facing the end 106a side of the release rod 106.

The intermediate member 150 shown in FIGS. 1 to 2B will now be explained. The intermediate member 150 includes the arm member 6, the range control shaft 34, a sleeve 15, a pin 17, the detent lever 40, and the like. The arm member 6 includes a forked portion 20 whose end sides are used to engage from both sides with the concave portion 22a formed on both sides of the ball nut 22. With the moving of the ball nut 22 in the axial direction of the ball screw shaft 21, the end side of the arm member 6 swings in reference to a through hole 33 (see FIGS. 2A and 3). Due to such swinging, the range control shaft 34 is rotated via the through hole 33.

Note that P, R, N, and D shown in FIG. 2A indicate positions of the arm member 6 that correspond to the P range, R range, N range, and D range of the shift lever 2, in that order from the motor 4 side toward the base portion 106b side of the release rod 106. In other words, selecting the P range, for example, disposes the arm member 6 in the position indicated as P, whereby the spool 7 is disposed in the P position.

The position sensor 8 shown in FIGS. 1 and 2A is disposed in the internal portion of the housing 10. At the center of the position sensor 8, the range control shaft 34 is fitted. For the position sensor 8, a potentiometer can be used, for example, and a voltage is output that corresponds to a turning angle of the range control shaft 34. An end portion of the range control shaft 34 is formed with a prism-shaped fitted portion 38. The fitted portion 38 is fitted with the rectangular through hole 33 of the arm member 6.

The spool 7 shown in FIG. 2B is a member that structures a portion of a manual valve 63 disposed inside the valve body 11. The spool 7 is a member that is supported movable in the axial direction (direction of arrows A and B). Movement of the spool 7 in the axial direction changes over the oil passage inside the valve body 11 to set a predetermined running range. Namely, the spool 7 can move to a P position corresponding to the P range, an R position corresponding to the R range, an N position corresponding to the N range, and a D position corresponding to the D range.

The detent mechanism 9 shown in FIGS. 1 and 2B will now be explained. The detent mechanism 9 includes the detent lever 40 (which is an example of an interlocking mechanism), a detent spring 41, and a roller 42. Among these, the detent lever 40 is a plate-shaped member. The detent lever 40 is designed to swing in the direction of arrows E and F, with such swinging centered around the range control shaft 34. An intermediate portion in FIG. 2B of the detent lever 40 is formed with a through hole 45 that engages with a portion 161 (see FIG. 6) of a parking mechanism (not shown).

The sleeve 15 and the range control shaft 34 may be separated at the time of assembly. The sleeve 15 is provided on the detent lever 40. In addition, the range control shaft 34 runs through the sleeve 15. A notch 16 formed by indenting the sleeve 15 in the axial direction is engaged with the pin 17 running through the range control shaft 34, whereby the sleeve 15 and the range control shaft 34 integrally rotate in the rotation direction.

The detent lever 40 shown in FIG. 2B is provided with range grooves a, c, e, and g, which act as four shift areas, in that order from the valve body 11 side toward the motor 4 side in the same figure. Between these range grooves a, c, e, and g, convex portions b, d, and f are formed. The range grooves a, c, e, and g correspond to the four positions of the spool 7, i.e., the P position, the R position, the N position, and the D position, in that order.

The detent spring 41 is formed by a generally long plate-shaped member. A base portion 48 is fixed to a fixing member, while an end is formed with a forked portion 50. Between the forked portion 50, the roller 42 is rotatably supported. The entire detent spring 41 acts as a leaf spring, wherein the roller 42 rotatably disposed on an end thereof presses against inclined surfaces of the range grooves a, c, e, and g of the detent lever 40 so as to accurately position and hold the detent lever 40.

In the range shift device 1 according to the present embodiment, the swinging motion (rotational motion) of the detent lever 40 in the direction of arrows E and F is operatively associated with the shifting motion of the spool 7 in the direction of arrows A and B. Namely, the range shift device 1 does not directly control the position of the spool 7. Rather, the range shift device 1 accurately controls the detent lever 40 based on the one-to-one correspondence of the detent lever 40 position and the spool 7 position, whereby accurate control of the spool 7 is achieved.

In the above structure, the housing 10 of the range shift device 1 accommodates the control unit 3, the output shaft 12 of the motor 4, the speed change mechanism 5, the arm member 6, the position sensor 8, the manual release mechanism 108, and the like. A portion of the range control shaft 34 of the intermediate member 150 also extends into the housing 10. The ball screw shaft 21, the ball nut 22, the arm member 6, and the like structure a mechanical transmission mechanism 51, which is an example of a mechanical transmission device.

Provided inside the case 62 of the automatic transmission 2 are the detent mechanism 9, the intermediate member 150, the manual valve 63, and the like.

Figure 3:
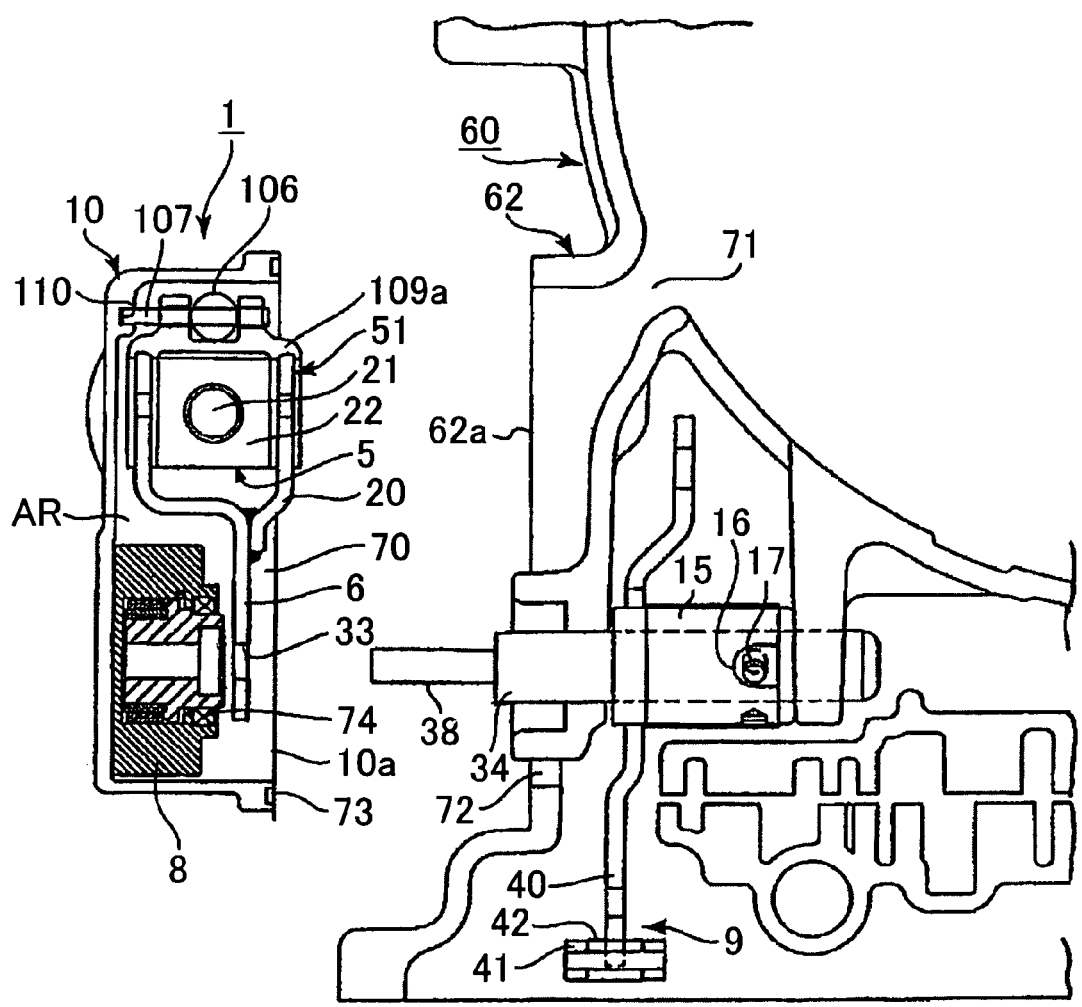
FIG. 3 is a drawing of a housing of the range shift device detached from a case of the automatic transmission in FIG. 1.

As FIG. 3 shows, the housing 10 of the range shift device 1 is detached from the case 62 of the automatic transmission 2. Inside the case 62, a speed change mechanism (not shown) that changes the rotational speed of an engine is accommodated, and a lubricant, i.e., oil circulates.

Figure 4:
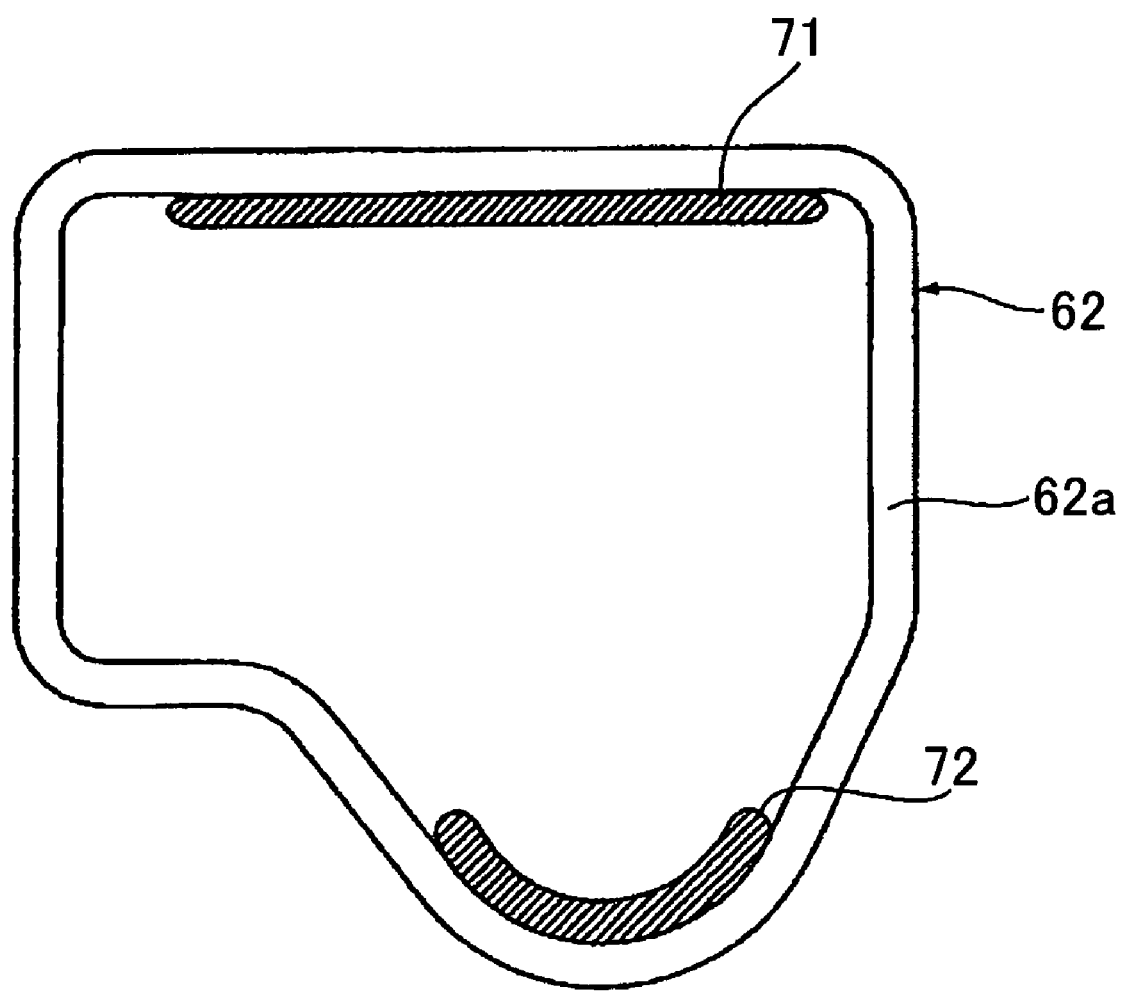
FIG. 4 is a drawing of a joined portion of the case of the automatic transmission shown in FIG. 3 as viewed from the left side.

As FIGS. 3 and 4 show, the case 62 is formed with communication holes 71 and 72, which guide the circulation of lubricant in the housing 10. The communication hole 71 is formed at an upper position, while the communication hole 72 is formed in an arc shape so as to surround a lower side of the range control shaft 34. The housing 10 is also formed with an opening portion 70 that receives lubricant. More specifically, the housing 10 is attached to the case 62 such that the opening portion 70 is positioned on the communication holes 71 and 72.

A joining portion 10a of the housing 10 and a joining portion 62a of the case 62 are in close contact with each other such that there is no leakage of lubricant, and the joining portion 10a is provided with an anti-leak seal 73. The anti-leak seal 73 may also be provided on the joining portion 62a of the case 62. In addition, the position sensor 8 is provided with a fluid tight seal 74 so that lubricant does not penetrate to the inside the position sensor 8. The seals 73 and 74 have O-rings, packing, and the like. Note that instead of the communication holes 71 and 72, a pipe (not shown) may be provided for circulating lubricant from the case 62 to the housing 10.

When the housing 10 of the range shift device 1 is attached to the case 62 of the automatic transmission 60, the through hole 33 of the arm member 6 and the position sensor 8 are engaged and attached with the fitted portion 38 of the range control shaft 34.

Next, the operation of the range shift device 1 according to the present embodiment will be explained using a shift from the P range to the R range as an example. Note that in FIG. 2B, a state is shown in which the P range is selected for the detent lever 40.

In the P range, the roller 42 of the detent mechanism 9 is disposed inside the range groove a. When the driver shifts the shift lever 2 from the P range to the R range, the corresponding shift signal S1 is input to the control unit 3. The control unit 3 thus rotates the motor 4, whereby the ball screw shaft 21 is rotated. The ball nut 22 is provided with the connection member 109, which is engaged with the release rod 106. Therefore, the ball nut 22 is prevented from rotating by the release rod 106, and is moved on the ball screw shaft 21 rightward from the position shown in FIG. 2A. In other words, the release rod 106 is used as a rotation-stopping mechanism for the ball nut 22, and thus a simple rotation-stopping mechanism for the ball nut 22 can be achieved.

The ball nut 22 then moves in a direction such that the U-shaped portion 109a of the connection member 109 separates from the pin 107 of the release rod 106. As a consequence, the connection between the release rod 106 and the ball nut 22 is broken, and the ball nut 22 moves without affecting the position of the release rod 106. Accordingly, there is no erroneous operation of the manual release mechanism 108.

With the movement of the ball nut 22, the arm member 6 swings in the direction of arrow M in FIG. 2A. This in turn rotates the detect lever 40 and moves the spool 7 in the direction of arrow A via the range control shaft 34. The control unit 3 stops the rotation of the motor 4 when an output voltage of the position sensor 8 reaches a value corresponding to the convex portion b in FIG. 2B. Accordingly, the roller 42 passes from inside the range groove a, over the convex portion b, and enters inside the range groove c.

Due to stopping of the motor 4, the detent lever 40 rotates in accordance with the energizing force of the roller 42, which is based on the elastic force of the detent spring 41. Through such rotation, the roller 42 is accurately positioned and held inside the range groove c. Thus, the spool 7 at the P position accurately shifts to the R position. When the detent lever 40 rotates due to stopping of the motor 4 and the action of the detent mechanism 9 described above, the ball nut 22 is moved in the axial direction and the ball screw shaft 21 is rotated via the range control shaft 34 and the arm member 6. In other words, the conversion mechanism 5 is structured such that rotational motion can be converted into linear motion, and conversely, linear motion into rotational motion.

Note that shifting to other running ranges is achieved in the same manner as described above.

In the event of a failure of the motor 4 during a state where the P range is selected, i.e., while in the state shown in FIG. 2A, the motor 4 becomes incapable of swinging the arm member 6 via the ball screw shaft 21, the ball nut 22, and the like. Accordingly, the range shift device 1 cannot shift the running range.

In such cases, the driver may pull the above-mentioned wire (not shown) to operate the manual release mechanism 108 and move the release rod 106 in the direction of arrow L (see FIG. 2A). In so doing, the pin 107 of the release rod 106 engages with the concave portion 109b of the connection member 109, which is provided on the ball nut 22, whereby the ball nut 22 reliably moves together with the release rod 106 in the direction of arrow L. As a consequence, the arm member 6 engaged with the ball nut 22 can be forcibly swung to a position corresponding to the N range shown in FIGS. 1 and 2A, for swift resolution of the motor 4 failure or the like.

According to the manual release mechanism 108 described above, the ball nut 22 is subject to driving from the release rod 106. Therefore, a release load (force to pull the wire) and a release stroke caused by the length of the arm member 6 can be set as appropriate to achieve a compact structure.

During operation of the automatic transmission 60, lubricant inside the case 62 of the automatic transmission 60 passes through the communication holes 71 and 72, and the opening portion 70 of the range shift device 1, to subsequently circulate within a space AR inside the housing 10 of the range shift device 1. At such time, lubricant constantly passes between the mechanical transmission mechanism 51 and the range control shaft 34. Thus, it is possible to maintain constant, smooth operation of the mechanical transmission mechanism 51 and the range control shaft 34.

As described above, the automatic transmission 60 is capable of circulating and supplying lubricant (oil) inside the automatic transmission via the communication holes 71 and 72 to the mechanical transmission mechanism 51 of the range shift device 1. Therefore, long-term smooth operation of the range shift device 1 can be maintained.

Furthermore, two adjacent walls between the housing 10 of the range shift device 1 and the case 62 of the automatic transmission 60 are avoided. The automatic transmission 60 is thus smaller and more compact.

Also, the housing 10 of the range shift device 1 is attached to the case 62 of the automatic transmission 60 such that the opening portion 70 of the housing 10 is positioned on the plurality of communication holes 71 and 72. Therefore, the automatic transmission 60 can perform smooth lubricant circulation, and long-term smooth operation of the range shift device can be maintained.

Furthermore, the joining portions 62a and 10a of the automatic transmission 60 and the range shift device 1 are provided with the anti-leak seal 73. Therefore, the automatic transmission 60 is able to effectively use lubricant.

The automatic transmission 60 is also provided with the fluid tight seal 74 to prevent lubricant from penetrating to the position sensor 8, which detects the rotational position of the range control shaft 34. Therefore, erroneous operation of the position sensor 8 can be prevented.

Moreover, lubricant from the automatic transmission 60 circulates in the space AR where the conversion mechanism 5 and the intermediate member 150 of the range shift device are accommodated. Therefore the range shift device 1 can achieve long-term smooth operation.

Second Embodiment

The automatic transmission 60 according to the first embodiment circulates and supplies lubricant to the range shift device 1 using the communication holes 71 and 72 (see FIG. 1) that are formed in the case 62. However, an automatic transmission 160 according to a second embodiment supplies lubricant to a range shift device 101 with a pipe (not shown). Therefore, a case 162 of the automatic transmission 160 according to the present embodiment is not formed with communication holes, as shown in FIGS. 6-9.

An end of the pipe is connected to the case 162 of the automatic transmission 160, and another end extends to the inside of housing 120 of the range shift device 101. The pipe extending to inside the housing 120 is disposed bent so as not to interfere with the swinging motion of the arm member 6 nor the linear reciprocal motion of the ball nut 22 and the release rod 106. Note that although only one pipe is disposed here, two pipes for supplying and discharging lubricant may be disposed.

Thus, an effect is obtained where an increased degree of freedom is achieved with respect to the attachment position of the range shift device 101. In addition to this, an effect identical to the effect of the automatic speed change according to the first embodiment is obtained by using a pipe to supply lubricant inside the case 162 of the automatic transmission 160 to the housing 120 of the range shift device 101.

Unlike the first embodiment, there is also no need to form the long communication holes 71 and 72 as shown in FIG. 4, thereby simplifying manufacture of the case 162.

An automatic transmission according to the present invention is mounted in a vehicle. Based on a shift position of a manual valve, the automatic transmission is used to shift a running range of a speed change mechanism, which is accommodated inside a case where oil circulates.

According to an exemplary aspect of the invention, the case includes a joining portion that closes the opening portion of the housing of the range shift device. Therefore, oil inside the case can be used for the range shift device, whereby a long-term smooth operation of the range shift device can be maintained.

According to an exemplary aspect of the invention, oil inside the automatic transmission can be circulated and supplied via the communication hole to the mechanical transmission device of the range shift device. Therefore, a long-term smooth operation of the range shift device can be maintained.

According to an exemplary aspect of the invention, the mechanical transmission means is accommodated on the housing side. Therefore, oil inside the case can be used for the mechanical transmission means, whereby a long-term smooth operation of the range shift device can be maintained.

According to an exemplary aspect of the invention, a housing is joined to the joining portion of the case at a plane including the joining portion, and a seal member is disposed between the case and the housing. Therefore, a long-term smooth operation of the range shift device can be maintained.

According to an exemplary aspect of the invention, the housing is attached to the case of the automatic transmission such that the opening portion of the housing is positioned on the plurality of communication holes. Therefore, oil can be smoothly circulated and a long-term smooth operation of the range shift device can be maintained.

According to an exemplary aspect of the invention, the joining portions between the automatic transmission and the range shift device are provided with an anti-leak seal. Therefore, oil can be effectively used.

According to an exemplary aspect of the invention, the electronic part that detects the rotational position of the mechanical transmission means is provided with a fluid tight seal for preventing the penetration of oil. Therefore, an erroneous operation of the electronic part can be prevented.

According to an exemplary aspect of the invention, oil circulates from the automatic transmission to the space where the conversion mechanism and the intermediate member of the range shift device are accommodated. Therefore, a long-term smooth operation of the range shift device can be achieved.

The invention claimed is:

1. An automatic transmission, comprising:
   a case; and
   a range shift device that includes:
   a motor that produces a driving force based on a signal from a manually operated shift operating device,
   a mechanical transmission that transmits the driving force of the motor via a range control shaft to a manual valve, and
   a housing with an opening portion on one side for the mechanical transmission that is accommodated at the housing, wherein:
   a portion of the range control shaft extends into the housing,
   the range control shaft is provided inside the case,
   the range shift device shifts a running range in accordance with a shift position of the manual valve,
   the case has a joining portion that closes the opening portion of the housing, and
   the housing is attached to the case.

2. The automatic transmission according to claim 1, wherein the case is formed with a communication hole that circulates and guides oil to the mechanical transmission of the range shift device.

3. The automatic transmission according to claim 1, wherein the opening portion of the housing is joined with the joining portion of the case at a plane that includes the joining portion, and a seal member is disposed between the case and the housing.

4. The automatic transmission according to claim 2, wherein:
   the case includes a plurality of communication holes,
   the housing is fixedly provided with the motor on an outer side thereof, and
   the housing is attached to the case such that the opening portion is positioned on the plurality of communication holes.

5. The automatic transmission according to claim 1, wherein the joining portion is provided with an anti-leak seal that prevents oil leakage.

6. The automatic transmission according to claim 5, wherein the range shift device includes an electronic part that detects a rotational position of the mechanical transmission, and the electronic part is provided with a fluid tight seal that prevents a penetration of oil therein.

7. The automatic transmission according to claim 3, wherein the joining portion is provided with an anti-leak seal that prevents oil leakage.

8. The automatic transmission according to claim 7, wherein the range shift device includes an electronic part that detects a rotational position of the mechanical transmission, and the electronic part is provided with a fluid tight seal that prevents a penetration of oil therein.

9. The automatic transmission according to claim 4, wherein the opening portion of the housing is joined with the joining portion of the case at a plane that includes the joining portion, and a seal member is disposed between the case and the housing.

10. The automatic transmission according to claim 9, wherein the joining portion is provided with an anti-leak seal that prevents oil leakage.

11. The automatic transmission according to claim 10, wherein the range shift device includes an electronic part that detects a rotational position of the mechanical transmission, and the electronic part is provided with a fluid tight seal that prevents a penetration of oil therein.

* * * * *